United States Patent
Liu

(10) Patent No.: US 10,831,686 B1
(45) Date of Patent: Nov. 10, 2020

(54) METHOD OF DETERMINING HARD DISK OPERATION STATUS

(71) Applicants: Inventec (Pudong) Technology Corporation, Shanghai (CN); INVENTEC CORPORATION, Taipei (TW)

(72) Inventor: Jian-Fei Liu, Shanghai (CN)

(73) Assignees: INVENTEC (PUDONG) TECHNOLOGY CORPORTION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/564,074

(22) Filed: Sep. 9, 2019

(30) Foreign Application Priority Data

Jul. 9, 2019 (CN) .......................... 2019 1 0616593

(51) Int. Cl.
| | | |
|---|---|---|
| *G06F 13/16* | (2006.01) | |
| *G11B 20/10* | (2006.01) | |
| *G06F 13/42* | (2006.01) | |

(52) U.S. Cl.
CPC ...... *G06F 13/1689* (2013.01); *G06F 13/4282* (2013.01); *G11B 20/10* (2013.01)

(58) Field of Classification Search
None
See application file for complete search history.

(56) References Cited

U.S. PATENT DOCUMENTS

| | | | | |
|---|---|---|---|---|
| 10,303,224 B1* | 5/2019 | Zhang | .................. | H05K 7/1487 |
| 2012/0133520 A1* | 5/2012 | Chang | .................. | G06F 13/409 |
| | | | | 340/635 |
| 2013/0080697 A1* | 3/2013 | Dhandapani | ........ | G06F 11/3034 |
| | | | | 711/114 |
| 2014/0189168 A1* | 7/2014 | Chen | ..................... | G06F 3/0653 |
| | | | | 710/19 |
| 2014/0354078 A1* | 12/2014 | Chen | ...................... | H04L 49/00 |
| | | | | 307/115 |
| 2015/0242357 A1* | 8/2015 | Pancholi | ............... | G06F 13/102 |
| | | | | 710/13 |
| 2017/0054634 A1* | 2/2017 | Zhou | ...................... | H04L 45/50 |
| 2017/0124006 A1* | 5/2017 | Chen | .................. | G06F 13/1605 |
| 2017/0168964 A1* | 6/2017 | Kung | .................. | G06F 13/4068 |
| 2018/0145869 A1* | 5/2018 | Hu | ...................... | H04L 41/0627 |

* cited by examiner

*Primary Examiner* — Henry Tsai
*Assistant Examiner* — Aurangzeb Hassan
(74) *Attorney, Agent, or Firm* — Locke Lord LLP; Tim Tingkang Xia, Esq.

(57) ABSTRACT

A method of determining a hard disk operation status is for determining an operation status of an electronic device which comprises a SGPIO port and a hard disk. The method comprises receiving an operation status raw signal of the hard disk through the SGPIO port, determining whether receiving a previous operation status raw signal of the hard disk has been performed before an operational period before receiving the operation status raw signal, generating an operation status adjusted signal according to the operation status raw signal of the hard disk and an enabled status signal of the SGPIO port when determining that receiving the previous operation status raw signal has not been performed before an operational period before receiving the operation status raw signal, and performing a delay procedure on the operation status adjusted signal according to a preset time interval to generate and output an operation status determined signal.

6 Claims, 4 Drawing Sheets

US 10,831,686 B1

METHOD OF DETERMINING HARD DISK OPERATION STATUS

CROSS-REFERENCE TO RELATED APPLICATIONS

This non-provisional application claims priority under 35 U.S.C. § 119(a) on Patent Application No(s). 201910616593.7 filed in China on Jul. 9, 2019 the entire contents of which are hereby incorporated by reference.

BACKGROUND

1. Technical Field

This disclosure relates to a method of determining a hard disk operation status.

2. Related Art

In general, when a baseboard management controller (BMC) would like to obtain the operation status of one or more hard disk in an electronic device or in a system, the signal from a serial general purpose input/output (SGPIO) port is usually analyzed by a complex programmable logic device (CPLD) so as to obtain the operation status of each hard disk. However, when the signal received by the BMC is transmitted when the SGPIO port is in an unstable status, the signal must have noise or surges, so that the BMC must generate a false alarm of the hard disk operation status.

SUMMARY

According to one or more embodiment of this disclosure, a method of determining a hard disk operation status is for determining an operation status of an electronic device which comprises a serial general purpose input/output (SGPIO) port and a hard disk. The method comprises receiving an operation status raw signal of the hard disk through the SGPIO port, determining whether receiving a previous operation status raw signal of the hard disk has been performed before an operational period before receiving the operation status raw signal, generating an operation status adjusted signal according to the operation status raw signal of the hard disk and an enabled status signal of the SGPIO port when determining that receiving the previous operation status raw signal has not been performed before an operational period before receiving the operation status raw signal, and performing a delay procedure on the operation status adjusted signal according to a preset time interval to generate and output an operation status determined signal.

According to one or more embodiment of this disclosure, a method of determining a hard disk operation status is for determining an operation status of an electronic device which comprises a SGPIO port and a hard disk. The method comprises receiving an operation status raw signal of the hard disk through the SGPIO port, determining whether the operation status raw signal indicates a normal operation or an abnormal operation, determining whether a previous operation status raw signal received before the operation status raw signal is received indicates the normal operation or the abnormal operation when the operation status raw signal indicates the abnormal operation, generating an operation status adjusted signal according to the operation status raw signal of the hard disk and an enabled status signal of the SGPIO port when the previous operation status raw signal indicates the normal operation, and performing a delay procedure on the operation status adjusted signal according to a preset time interval to generate and output an operation status determined signal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
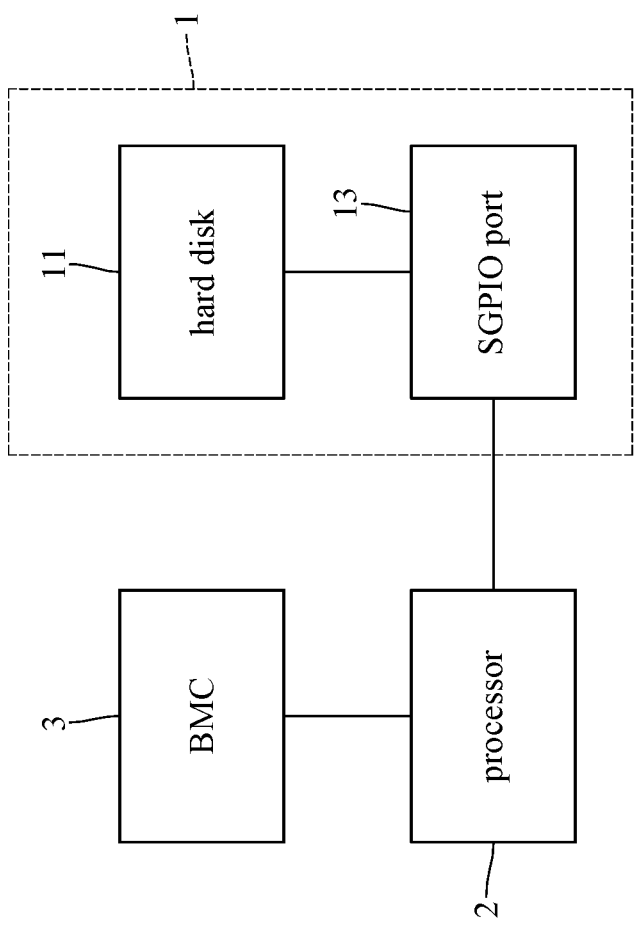
FIG. 1 is a function block diagram of a system applied to a method of determining a hard disk operation status according to one or more embodiments of this disclosure.

The method of determining a hard disk operation status provided in one or more embodiments of this disclosure is for determining the operation status of an electronic device comprising a serial general purpose input/output port and a hard disk, especially the actual operation status of the hard disk. Please refer to FIG. 1 which is a function block diagram of an operating system applied to a method of determining a hard disk operation status according to one or more embodiments of this disclosure. Said operating system can comprise an electronic device 1, a processor and a baseboard management controller (BMC) 3. The electronic device 1 comprises a hard disk 11 and a serial general purpose input/output (SGPIO) port 13, wherein the hard disk is, for example, a SATA HDD, a SAS HDD, etc., and electrically connected with the SGPIO port 13. FIG. 1 exemplarily illustrates that the electronic device 1 comprises one hard disk 11; however, in another embodiment, the electronic device 1 can comprise a number of hard disks 11 electrically connected with the SGPIO port 13 respectively. For example, the electronic device 1 can be a host bus adapter (HBA), a redundant array of independent disks (RAID), a platform controller hub (PCH) or other device using SGPIO to obtain the status of the hard disk.

The processor 2 is, for example, a complex programmable logic device (CPLD), a field programmable gate array (FPGA), etc., and can be electrically connected with the SGPIO port 13 so as to obtain the information of one or more hard disks 11. The processor 2 can comprise a register (e.g. user defined register) for temporarily storing the information of each hard disk 11. In an embodiment, the processor 2 is a CPLD disposed on a backplane (BP). The BMC 3 can be electrically connected with the processor 2 and read the information of each hard disk 11 of the electronic device 1 from the register, so as to obtain the statuses of each hard disk 11, such as activity status, locate status and fail status.

Figure 2:
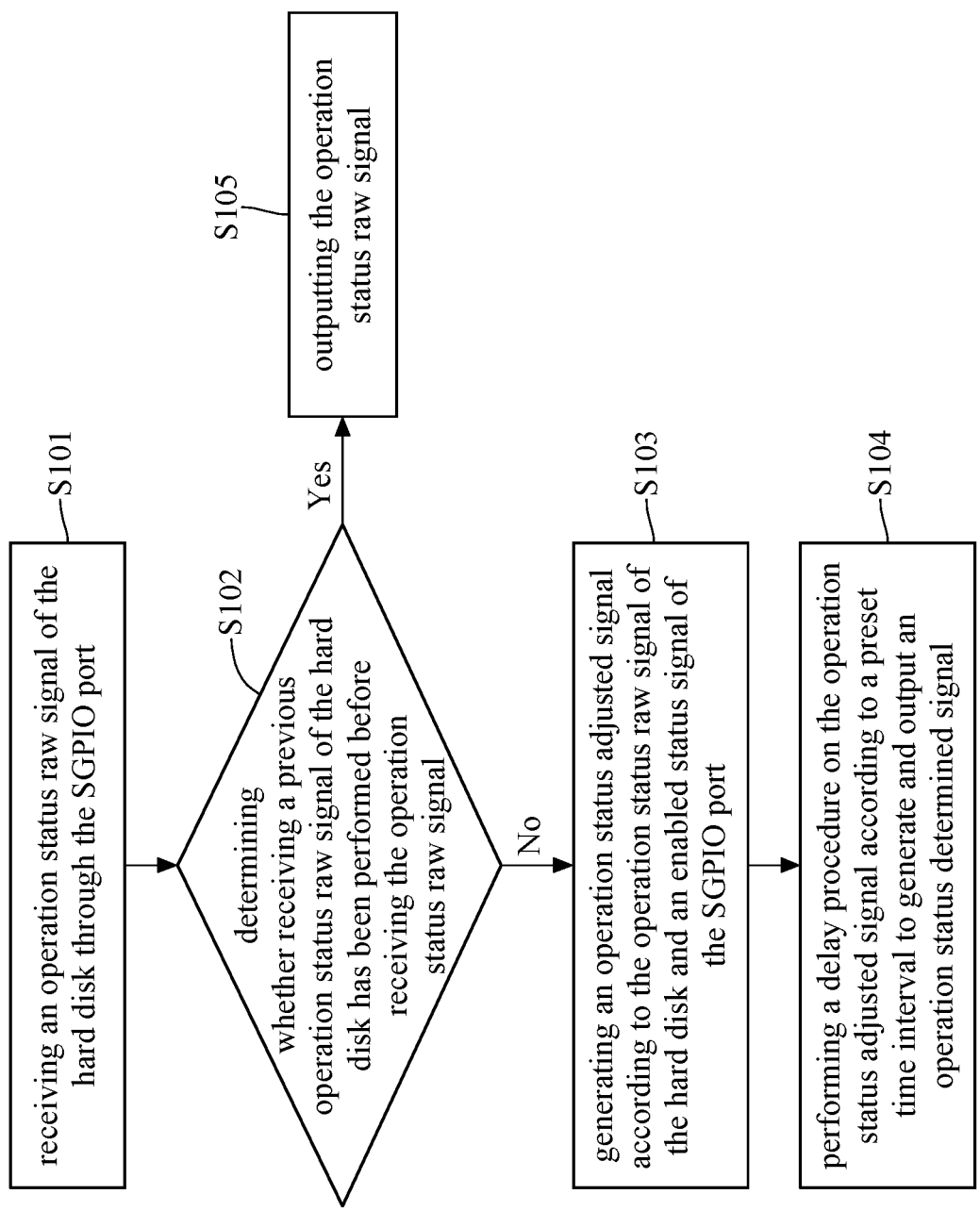
FIG. 2 is a flow chart of a method of determining a hard disk operation status according to an embodiment of this disclosure.

Please refer to FIG. 1 and FIG. 2, wherein FIG. 2 is a flow chart of a method of determining a hard disk operation status according to an embodiment of this disclosure.

In step S101, the processor 2 receives an operation status raw signal of the hard disk 11 through the SGPIO port 13, wherein the operation status raw signal can include an activity status signal, a locate status signal and a fail status signal. As aforementioned, in the operating system shown by FIG. 1, since the processor 2 obtains the information of the hard disk 11 through the SGPIO port 13 rather than directly from the hard disk 11, the obtained information may have an error if the SGPIO port 13 is unstable. In other words, the operation status raw signal of the hard disk 11 obtained through the SGPIO port 13 in step S101 does not necessarily represent the actual operation status of the hard disk 11. Accordingly, the processor 2 performs the following steps.

In step S102, the processor 2 determines whether receiving a previous operation status raw signal of the hard disk 11 has been performed before receiving the operation status raw signal of the hard disk 11. More particularly, when the electronic device 1 is just started (powered on), it usually has unstable conditions. Step S102 can be performed for determining whether the electronic device 1 is just powered on. When the processor 2 determines that receiving a previous operation status raw signal of the hard disk 11 has not been performed before receiving the operation status raw signal of the hard disk 11, the processor 2 determines that the electronic device 1 is just powered on and then performs step S103. Moreover, the just-start phase of the electronic device 1 can be defined as an operational period after the electronic device 1 is powered on. In this embodiment, the processor 2 determines whether receiving the previous operation status raw signal of the hard disk 11 has been performed before an operational period before receiving the operation status raw signal of the hard disk 11. For example, the operational period can include the first and second periods of SLoad signal of the SGPIO port 13, with SLoad signal indicating when a bit stream ends and when the bit stream restarts.

In step S103, the processor 2 generates an operation status adjusted signal according to the operation status raw signal of the hard disk 11 and an enabled status signal of the SGPIO port 13. The enabled status signal can indicate whether the SGPIO port 13 is enabled or disabled. More particularly, the processor 2 can select the fail status signal in the operation status raw signal of the hard disk 11 and the enabled status signal of the SGPIO port 13 to perform a logical operation to generate the operation status adjusted signal. Assuming that the fail status signal in the operation status raw signal is represented by sgpio_fail (its value is 0 as indicating a normal status, and is 1 as indicating an abnormal status) and the enabled status signal is represented by sgpio_active_n (its value is 0 as indicating a disabled status, and is 1 as indicating an enabled status), the processor 2 generates the operation status adjusted signal hdd_fail (its value is 0 as indicating a normal status, and is 1 as indicating an abnormal status) using the following operational logic:

hdd_fail=sgpio_fail&(!sgpio_active_n). That is, the processor 2 performs an inverse operation on the enabled status signal, and performs a AND operation on the result of the inverse operation and the fail status signal, so as to generate the operation status adjusted signal.

In step S104, the processor 2 performs a delay procedure on the operation status adjusted signal according to a preset time interval to generate and output an operation status determined signal. For example, the delay procedure is a de-bounce function. If the preset time interval is t seconds, in this step, the processor 2 waits for t seconds and then picks the operation status adjusted signal generated at the time after t seconds to be the operation status determined signal, and stores the operation status determined signal in the register or outputs it to the BMC 3. Particularly, the preset time interval is determined based on the read period of the BMC 3. More particularly, the preset time interval can be 2 to 5 times of the read period, with 4 times being preferable. In an embodiment, the BMC 3 receives the operation status determined signal from the processor 2, and outputs an operation status message corresponding to the operation status determined signal.

In the embodiment as shown in FIG. 2, when the result of step S102 determined by the processor 2 is that the previous operation status raw signal of the hard disk 11 has been received by the processor 2 before the operation status signal of the hard disk 11 is received by the processor 2, the processor 2 determines that the electronic device 1 is not in the just-start phase, and accordingly, stores or outputs the operation status raw signal directly. In the embodiment wherein the just-start phase is defined as an operational period after the electronic device 1 is powered on, the processor 2 determines that the electronic device 1 is not in the just-start phase when determining that receiving the previous operation status raw signal of the hard disk 11 has been performed before an operational period before receiving the operation status raw signal of the hard disk 11. Accordingly, the processor 2 stores or outputs the operation status raw signal directly.

In an embodiment, before performing the aforementioned step S103, the method of determining the hard disk operation status can further comprise analyzing the operation status raw signal by the processor 2, especially a CPLD. More particularly, the activity status signal, the locate status signal and the fail status signal in the operation status raw signal provided by the SGPIO port 13 may be in series. The processor 2 can decode the serial operation status raw signal to convert the serial operation status raw signal into the activity status signal, the locate status signal and the fail status signal in parallel, and then pick the fail status signal for the signal processing procedure of step S103 as aforementioned.

By the above steps, the processor 2 can perform a specific determining and signal processing procedure on the signal received through the SGPIO port 13, so that the unstable status of the electronic device 1 as just started may be avoided, and thus the accuracy of determining the hard disk operation status may be improved.

Figure 3:
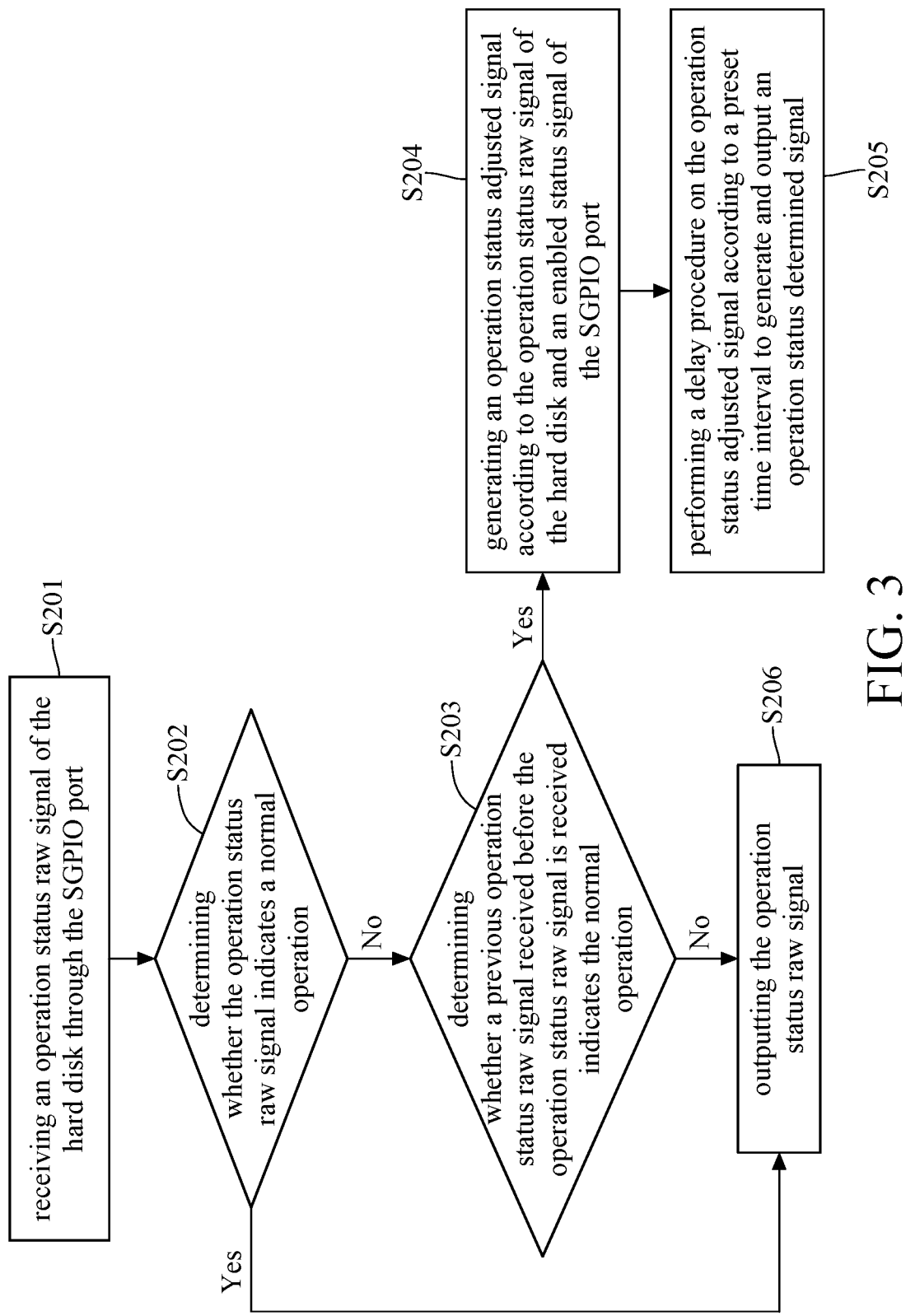
FIG. 3 is a flow chart of a method of determining a hard disk operation status according to another embodiment of this disclosure.

In addition to being applied in the just-start phase of the electronic device which comprises the hard disk and the SGPIO, the method of determining the hard disk operation status of this disclosure can also be applied in other operating phase. Please refer to FIG. 1 and FIG. 3, wherein FIG. 3 is a flow chart of a method of determining a hard disk operation status according to another embodiment of this disclosure.

In step S201, similar to step S101, the processor 2 receives the operation status raw signal of the hard disk 11 through the SGPIO port 13, wherein the operation status raw signal can include the activity status signal, the locate status signal and the fail status signal of the hard disk 11.

In step S202, the processor 2 determines whether the operation status raw signal indicates a normal operation or an abnormal operation. More particularly, this step can comprise analyzing the operation status raw signal by the processor 2, especially a CPLD. More specifically, the activity status signal, the locate status signal and the fail status signal in the operation status raw signal provided by the SGPIO port 13 may be in series. The processor 2 can decode the serial operation status raw signal to convert the serial operation status raw signal into the activity status signal, the locate status signal and the fail status signal in parallel, and then determine whether the fail status signal indicates the normal operation or the abnormal operation. For example, when the value of the fail status signal is 0, the fail status signal indicates the normal operation; when the value of the fail status signal is 1, the fail status signal indicates the abnormal operation. When the processor 2 determines that the operation status raw signal indicates the abnormal operation, the processor 2 performs step S203.

In step S203, the processor 2 determines whether a previous operation status raw signal of the hard disk 11 indicates the normal operation or the abnormal operation, wherein the previous operation status raw signal has been received by the processor 2 before the operation status raw signal of the hard disk 11 is received by the processor 2. When the processor 2 determines that the previous operation status raw signal indicates the normal operation, the processor 2 performs steps S204 and S205. In step S204, the processor 2 generates an operation status adjusted signal according to the operation status raw signal of the hard disk 11 and the enabled status signal of the SGPIO port 13. In step S205, the processor 2 performs the delay procedure on the operation status adjusted signal according to the preset time interval to generate and output an operation status determined signal. The detailed implementation of steps S204 and S205 are respectively similar to that of the aforementioned steps S103 and S104, so the related details are not repeated here. In an embodiment, the BMC 3 receives the operation status determined signal from the processor 2, and outputs an operation status message corresponding to the operation status determined signal.

In the embodiment as shown in FIG. 3, when the result of step S202 determined by the processor 2 is that the operation status raw signal indicates the normal operation or the result of step S203 determined by the processor 2 is that the previous operation status raw signal indicates the abnormal operation, the processor 2 determines that the electronic device 1 is not in the unstable status, and then stores or outputs the operation status raw signal directly.

Since the processor 2 obtains the information of the hard disk 11 through the SGPIO port 13 rather than directly from the hard disk 11, even if the processor 2 determines that the status of the hard disk 11 is changed from normal to abnormal, this change may be caused by the unstable SGPIO port 13 but not the actual condition of the hard disk 11. By the aforementioned steps, the processor 2 can perform a specific determining and signal processing procedure on the signal received through the SGPIO port 13, so that the accuracy of determining the hard disk operation status may be improved, and false alarms may be reduced.

The aforementioned embodiment of FIG. 2 describes the signal processing performed in the just-start phase of the electronic device; the embodiment of FIG. 3 describes the signal processing performed when the operation signal outputted by the electronic device 1 changes from normal to abnormal. In yet another embodiment, the method of determining the hard disk operation status can perform the specific signal processing in the just-start phase of the electronic device 1 as well as when the operation signal changes from normal to abnormal. Please refer to FIG. 1 and FIG. 4, wherein FIG. 4 is a flow chart of a method of determining a hard disk operation status according to yet another embodiment of this disclosure.

Figure 4:
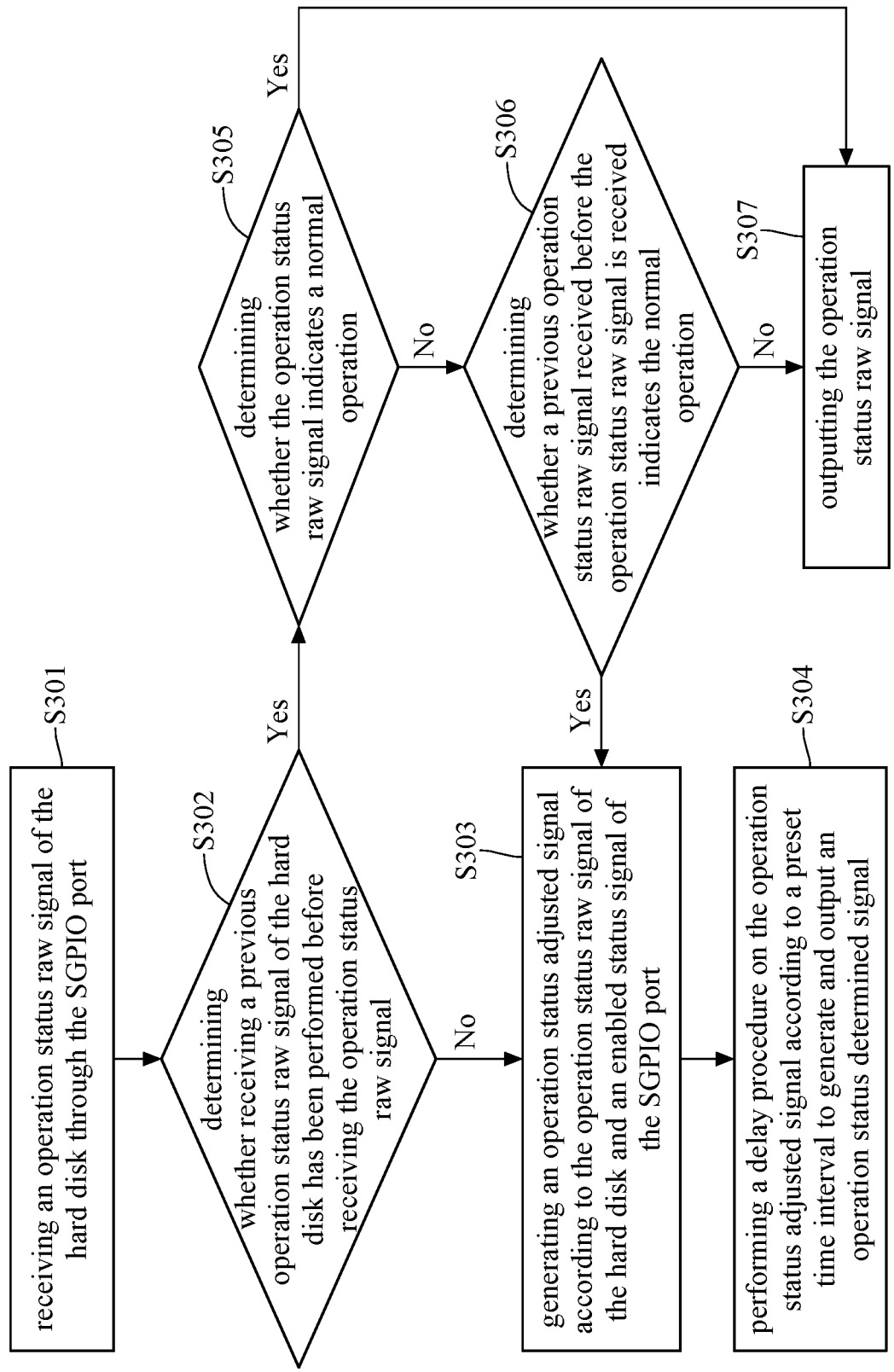
FIG. 4 is a flow chart of a method of determining a hard disk operation status according to yet another embodiment of this disclosure.

Steps S301-S304 in FIG. 4, respectively similar to steps S101-S104 in FIG. 2, describe the signal processing performed by the processor 2 when the processor 2 determines that the electronic device 1 is in the just-start phase (e.g. when a signal of the electronic device 1 is firstly generated and outputted to the processor 2, or within an operational period after the electronic device 1 is powered on). The related details of these steps are similar to those in the aforementioned embodiments, so they are not repeated here. When the processor 2 determines that the electronic device 1 is not in the just-start phase, the processor 2 performs step S305: determining whether the operation status raw signal indicates a normal operation. When the processor 2 determines that the operation status raw signal indicate an abnormal operation rather than the normal operation, the processor 2 performs step S306: determining whether the previous operation status raw signal received before the operation status raw signal is received indicates the normal operation or the abnormal operation. When the processor 2 determines that the previous operation status raw signal indicates the normal operation, that is, the indication of the operation status raw signal is changed from normal to abnormal, the processor 2 performs the signal processing procedure of steps S303 and S304. Steps S305 and S306 are respectively similar to steps S202 and S203 in the aforementioned embodiment of FIG. 3, so the related details are not repeated here.

In the embodiment as shown in FIG. 4, when the result of step S305 determined by the processor 2 is that the operation status raw signal indicates the normal operation or the result of step S306 determined by the processor 2 is that the previous operation status raw signal indicates the abnormal operation, the processor 2 determines that the electronic device 1 is not in the unstable status, and then stores or outputs the operation status raw signal directly.

In view of the above description, the method of determining a hard disk operation status can determine whether the applied electronic device is in an unstable status to selectively perform a specific processing procedure for an operation status signal, so that the accuracy of determining the hard disk operation status may be improved, and false alarms may be reduced.

What is claimed is:

1. A method of determining a hard disk operation status, for determining an operation status of an electronic device which comprises a serial general purpose input/output port and a hard disk, comprising:
   receiving an operation status raw signal of the hard disk through the serial general purpose input/output port;
   determining whether receiving a previous operation status raw signal of the hard disk has been performed before an operational period before receiving the operation status raw signal;
   generating an operation status adjusted signal according to the operation status raw signal of the hard disk and an enabled status signal of the serial general purpose input/output port when determining that receiving the previous operation status raw signal has not been performed before an operational period before receiving the operation status raw signal; and
   performing a delay procedure on the operation status adjusted signal according to a preset time interval to generate and output an operation status determined signal;

wherein receiving the operation status raw signal of the hard disk through the serial general purpose input/output port is periodically performed with a read period, and the preset time interval is 4 times of the read period.

2. The method according to claim 1, further comprising:
analyzing the operation status raw signal by a complex programmable logic device.

3. The method according to claim 1, further comprising:
receiving the operation status determined signal, and generating and outputting an operation status message corresponding to the operation status determined signal by a baseboard management controller.

4. A method of determining a hard disk operation status, for determining an operation status of an electronic device which comprises a serial general purpose input/output port and a hard disk, comprising:
receiving an operation status raw signal of the hard disk through the serial general purpose input/output port;
determining whether the operation status raw signal indicates a normal operation or an abnormal operation;
determining whether a previous operation status raw signal received before the operation status raw signal is received indicates the normal operation or the abnormal operation when the operation status raw signal indicates the abnormal operation;
generating an operation status adjusted signal according to the operation status raw signal of the hard disk and an enabled status signal of the serial general purpose input/output port when the previous operation status raw signal indicates the normal operation; and
performing a delay procedure on the operation status adjusted signal according to a preset time interval to generate and output an operation status determined signal;
wherein receiving the operation status raw signal of the hard disk through the serial general purpose input/output port is periodically performed with a read period, and the preset time interval is 4 times of the read period.

5. The method according to claim 4, wherein determining whether the operation status raw signal indicates the normal operation or the abnormal operation comprises:
analyzing the operation status raw signal by a complex programmable logic device.

6. The method according to claim 4, wherein determining whether the operation status raw signal indicates the normal operation or the abnormal operation comprises:
receiving the operation status determined signal, and generating and outputting an operation status message corresponding to the operation status determined signal by a baseboard management controller.

* * * * *